US012675902B2

(12) United States Patent
Inoue et al.

(10) Patent No.: US 12,675,902 B2
(45) Date of Patent: *Jul. 7, 2026

(54) IMPRESSION EVALUATION OF AN IMAGE BASED ON SIMILARITY TO A REFERENCE IMAGE

(71) Applicant: Konica Minolta, Inc., Tokyo (JP)

(72) Inventors: Satoru Inoue, Kunitachi (JP); Shoichi Uratani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 18/321,309

(22) Filed: May 22, 2023

(65) Prior Publication Data

US 2023/0386079 A1 Nov. 30, 2023

(30) Foreign Application Priority Data

May 31, 2022 (JP) .................................. 2022-088858
Mar. 8, 2023 (JP) .................................. 2023-035184

(51) Int. Cl.
*G06V 10/44* (2022.01)
*G06T 7/73* (2017.01)
(Continued)

(52) U.S. Cl.
CPC .............. *G06T 7/74* (2017.01); *G06V 10/443* (2022.01); *G06V 10/462* (2022.01); *G06V 10/56* (2022.01);
(Continued)

(58) Field of Classification Search
None
See application file for complete search history.

(56) References Cited

U.S. PATENT DOCUMENTS 9,387,533 B1 * 7/2016 Heneveld ............. B22D 29/001
10,176,396 B2 * 1/2019 Smyth .................... G06V 10/25
(Continued)

FOREIGN PATENT DOCUMENTS

AU 2012268887 A1 * 7/2014
JP 2007-316812 A 12/2007
(Continued)

OTHER PUBLICATIONS

Extended European Search Report dated Oct. 9, 2023 for corresponding European Application No. 23175031.6.
(Continued)

*Primary Examiner* — Tahmina N Ansari
(74) *Attorney, Agent, or Firm* — LUCAS & MERCANTI, LLP

(57) ABSTRACT

An impression analysis system includes: an input obtainer that receives an evaluation target image; and a hardware processor, wherein the hardware processor: extracts a low-order image feature amount, and a high-order image feature amount, from the evaluation target image, and compares data obtained by extracting a low-order image feature amount and a high-order image feature amount from a reference image associated with an impression evaluation, with data of the image feature amounts extracted by a feature amount extractor, and calculates a similarity between the evaluation target image and the reference image.

10 Claims, 9 Drawing Sheets

(51) Int. Cl.

| | |
|---|---|
| *G06V 10/46* | (2022.01) |
| *G06V 10/56* | (2022.01) |
| *G06V 10/74* | (2022.01) |
| *G06V 10/77* | (2022.01) |

(52) U.S. Cl.

CPC ........ *G06V 10/761* (2022.01); *G06V 10/7715*
(2022.01)

(56) References Cited

U.S. PATENT DOCUMENTS

| | | | | |
|---|---|---|---|---|
| 10,776,982 | B2 * | 9/2020 | Risser | G06T 11/10 |
| 11,915,464 | B2 * | 2/2024 | Donner | G06N 3/0442 |
| 2002/0054694 | A1 * | 5/2002 | Vachtsevanos | G06V 10/421 |
| | | | | 382/156 |
| 2015/0199428 | A1 | 7/2015 | Jia et al. | |
| 2020/0401938 | A1 * | 12/2020 | Etkin | G06N 3/09 |
| 2020/0402289 | A1 * | 12/2020 | Risser | G06T 11/10 |
| 2020/0411164 | A1 * | 12/2020 | Donner | G06F 16/583 |
| 2021/0056663 | A1 * | 2/2021 | Zhang | G06T 11/60 |
| 2023/0386005 | A1 * | 11/2023 | Inoue | G06T 7/0002 |
| 2023/0386079 | A1 * | 11/2023 | Inoue | G06V 10/751 |

FOREIGN PATENT DOCUMENTS

| | | | |
|---|---|---|---|
| JP | 2018-195078 | A | 12/2018 |
| JP | 6746976 | B2 | 8/2020 |
| JP | 2021-068063 | A | 4/2021 |

OTHER PUBLICATIONS

Wen Sun et al; SPSIM: A Superpixel-Based Similarity Index for Full-Reference Image Quality Assessment; IEEE Transactions on Image Processing, IEEE; USA, vol. 27, No. 9; Sep. 2018; pp. 4232-4244; XP011684559.

Office Action, dated Oct. 21, 2025, which was issued for the corresponding European Patent Application No. 23175031.6, 6 pages.

Office Action, dated Apr. 14, 2026, which was issued for the corresponding Japanese Patent Application No. 2023-035184, 8 pages, with English translation.

Jian Li, et al., Webpage saliency prediction with multi-features fusion, 2016 IEEE International Conference on Image Processing (ICIP), IEEE, 2016, https://ieeexplore.ieee.org/document/7532442,IELOnline (IEEE Xplore).

* cited by examiner

Imo

FIG.4A
Imc
FIG.4B
FIG.4C
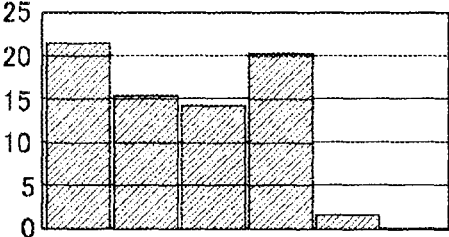

FIG.7
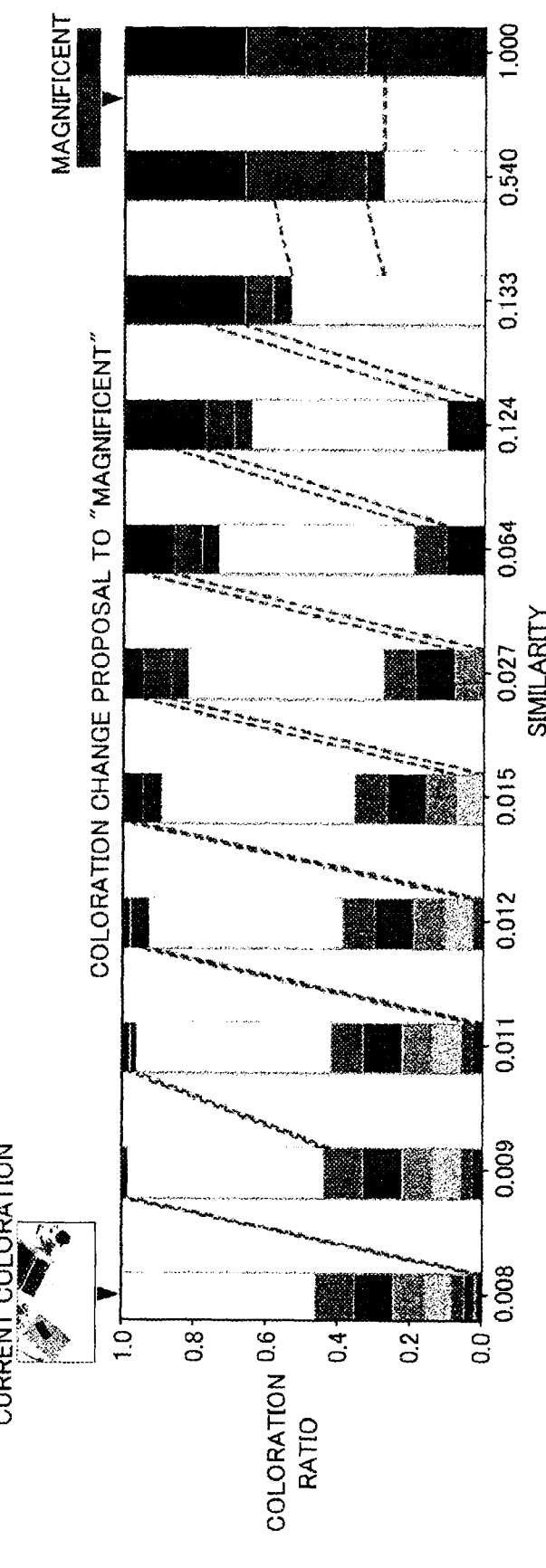
COLORATION CHANGE PROPOSAL TO "MAGNIFICENT"
MAGNIFICENT
CURRENT COLORATION
COLORATION RATIO
SIMILARITY

FIG.8

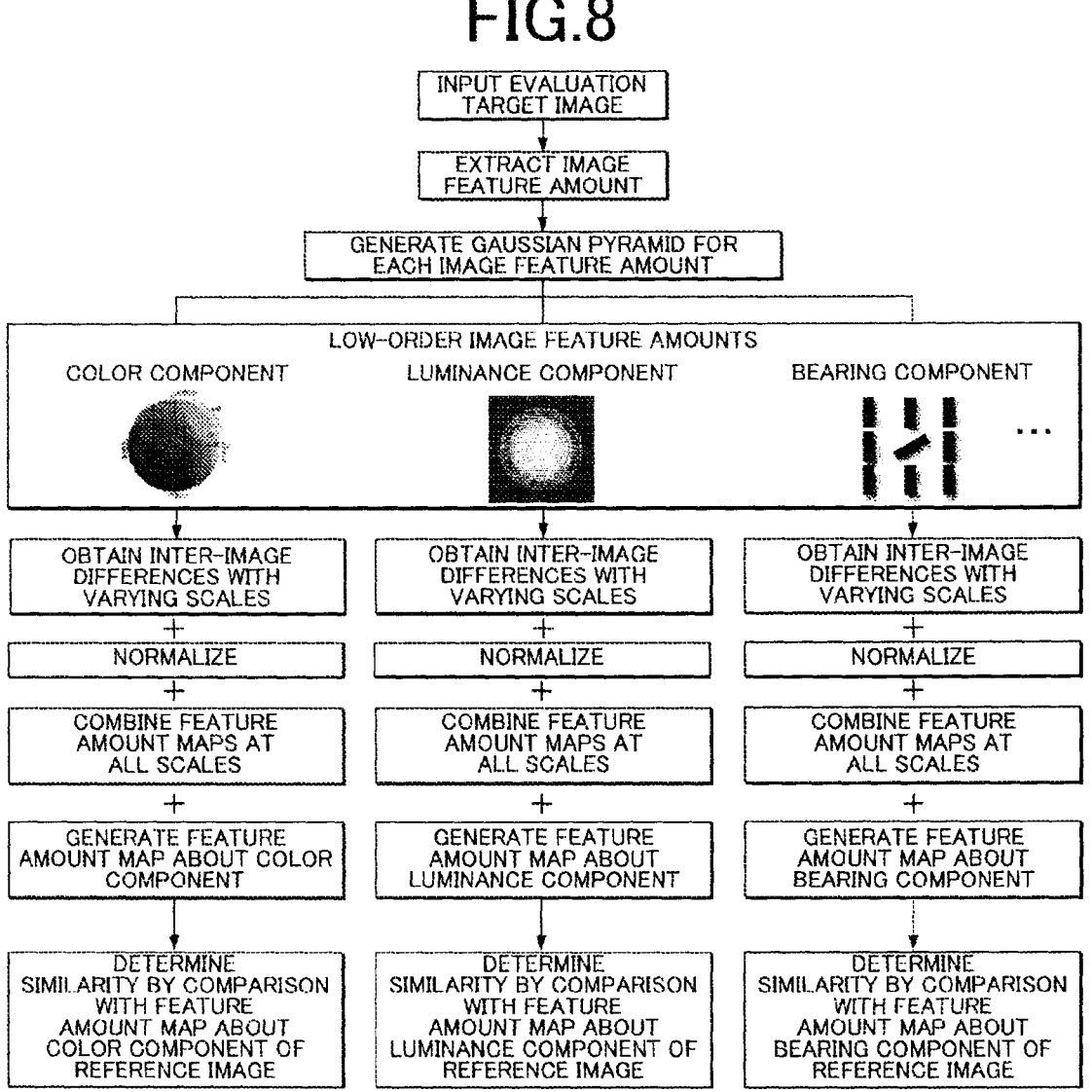

INPUT EVALUATION
TARGET IMAGE

EXTRACT IMAGE
FEATURE AMOUNT

GENERATE GAUSSIAN PYRAMID FOR
EACH IMAGE FEATURE AMOUNT

LOW-ORDER IMAGE FEATURE AMOUNTS

COLOR COMPONENT     LUMINANCE COMPONENT     BEARING COMPONENT     ...

| OBTAIN INTER-IMAGE DIFFERENCES WITH VARYING SCALES | OBTAIN INTER-IMAGE DIFFERENCES WITH VARYING SCALES | OBTAIN INTER-IMAGE DIFFERENCES WITH VARYING SCALES |
|---|---|---|
| NORMALIZE | NORMALIZE | NORMALIZE |
| COMBINE FEATURE AMOUNT MAPS AT ALL SCALES | COMBINE FEATURE AMOUNT MAPS AT ALL SCALES | COMBINE FEATURE AMOUNT MAPS AT ALL SCALES |
| GENERATE FEATURE AMOUNT MAP ABOUT COLOR COMPONENT | GENERATE FEATURE AMOUNT MAP ABOUT LUMINANCE COMPONENT | GENERATE FEATURE AMOUNT MAP ABOUT BEARING COMPONENT |
| DETERMINE SIMILARITY BY COMPARISON WITH FEATURE AMOUNT MAP ABOUT COLOR COMPONENT OF REFERENCE IMAGE | DETERMINE SIMILARITY BY COMPARISON WITH FEATURE AMOUNT MAP ABOUT LUMINANCE COMPONENT OF REFERENCE IMAGE | DETERMINE SIMILARITY BY COMPARISON WITH FEATURE AMOUNT MAP ABOUT BEARING COMPONENT OF REFERENCE IMAGE |

FIG.9

| | INPUT IMAGE | TAGGED EXAMPLE 1 | TAGGED EXAMPLE 2 |
|---|---|---|---|
| IMAGE 1 | | COOL | COOL: 4.8<br>NATURAL: 1.2<br>MAGNIFICENT: 3.4 |
| IMAGE 2 | | NATURAL | COOL: 1.8<br>NATURAL: 4.2<br>MAGNIFICENT: 1.2 |
| IMAGE 3 | | NATURAL | COOL: 2.8<br>NATURAL: 3.2<br>MAGNIFICENT: 3.1 |
| ⋮ | ⋮ | . | ⋮ |

IMPRESSION EVALUATION OF AN IMAGE BASED ON SIMILARITY TO A REFERENCE IMAGE

REFERENCE TO RELATED APPLICATIONS

The entire disclosure of Japanese Patent Application No. 2022-088858, filed on May 31, 2022, and Japanese Patent Application No. 2023-035184 filed on Mar. 8, 2023, including description, claims, drawings and abstract is incorporated herein by reference in its entirety.

TECHNICAL FIELD

The present invention relates to an impression analysis system, an impression analysis method, and a recording medium.

DESCRIPTION OF THE RELATED ART

Conventionally, a discussion has been made that performs similarity evaluation and impression evaluation of an image by scoring a similarity between an evaluation target image and a reference image to be referred to. As for such impression evaluation, a bottom-up type evaluation method based on low-order image feature amounts that include the hue, color tone, and font size has been known. A top-down type approach that adopts, as training data, images preliminarily labelled impression scores, and performs impression evaluation through deep learning has also been known.

For example, JP 6746976B describes an information processing apparatus that creates a design sample including a design item associated with multiple design elements defining a design. The apparatus determines a basic feeling score indicating the degree of contribution of the design element to evocation of a basic taste, and an accent feeling score indicating the degree of contribution of the design element to evocation of an accent taste, with respect to each design element, computes a composite feeling score with respect to each design element by mixing the basic feeling score with the accent feeling score, determines a maximum value design element having the maximum composite feeling score with respect to each design item, computes a basic taste evocation degree on the basis of the total value of the basic feeling scores of the maximum value design elements of all the design items, and determines a combination of maximum value design elements having basic taste evocation degrees equal to or higher than an evocation degree threshold, as a combination of adaptive design elements.

According to such a method, the impression of an image serving as an evaluation target can be evaluated as a score.

SUMMARY OF THE INVENTION

Unfortunately, the configuration described in JP 6746976B does not consider high-order image feature amounts (line-of-sight guidance etc.) that include presence of a tendency that when a person views an image, such as a design, the line of sight is spiritually and psychologically guided, and they view a certain area depending on situations (e.g., the center position in the entirety, the top left in cases of magazines, webpages, etc.), and a tendency that the line of sight is directed to a portion to be easily processed. Accordingly, it is difficult to make the impression evaluation be closer to actual human recognition.

In the case of approach of guiding evaluation of an evaluation target image as an impression using deep learning, impression evaluation in consideration of actual human recognition can be performed but it cannot be shown which factor (image feature amount) brings such impression evaluation. Accordingly, there is a problem that it is difficult for an evaluator (designer etc.) to know the design similarity, and the directionality of improving the impression, based on a result of impression evaluation obtained using deep learning.

The present invention has been made in view of the problem in the conventional art described above, and has an object to provide an impression analysis system, an impression analysis method, and a program that can achieve an evaluation result having a high description accuracy for the impression, and provide an evaluation result close to impression evaluation by a person.

To achieve at least one of the abovementioned objects, according to an aspect of the present invention, an impression analysis system reflecting one aspect of the present invention includes: an input obtainer that receives an evaluation target image; and a hardware processor, wherein the hardware processor: extracts a low-order image feature amount, and a high-order image feature amount, from the evaluation target image, and compares data obtained by extracting a low-order image feature amount and a high-order image feature amount from a reference image associated with an impression evaluation, with data of the image feature amounts extracted by a feature amount extractor, and calculates a similarity between the evaluation target image and the reference image.

According to another aspect of the present invention, an impression analysis method includes: extracting a low-order image feature amount, and a high-order image feature amount, from an input evaluation target image; and similarity determining that compares data obtained by extracting a low-order image feature amount and a high-order image feature amount from reference image associated with an impression evaluation, with data of the image feature amounts extracted by the feature amount extracting, and calculates a similarity between the evaluation target image and the reference image.

According to another aspect of the present invention, a non-transitory computer readable recording medium stores a program that causes a computer to perform: extracting a low-order image feature amount, and a high-order image feature amount, from an input evaluation target image; and similarity determining that compares data obtained by extracting a low-order image feature amount and a high-order image feature amount from reference image associated with an impression evaluation, with data of the image feature amounts extracted by the feature amount extracting, and calculates a similarity between the evaluation target image and the reference image.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 4A shows an example of a reference image;

FIG. 4B shows color components constituting the reference image, in a clustered manner;

FIG. 4C shows the color components shown in FIG. 4B in a histogram;

FIG. 7 shows an improvement proposal example of changing the impression by changing the coloration of the evaluation target image;

FIG. 8 is an explanatory view illustrating a flow of an impression analysis process for an evaluation target image in a conventional example;

FIG. 9 shows an analysis example in a case where image impression analysis is performed in deep learning.

DETAILED DESCRIPTION

Referring to FIGS. 1 to 10, embodiments of an impression analysis system, an impression analysis method, and a program according to the present invention are described.

The impression analysis system 100 (see FIG. 1) can show an analysis result about an impression when an evaluator (user etc.) intends to know which impression a certain image ("evaluation target image" described later) makes for a viewing person, and how a desired impression can be made. It is assumed that the evaluator (user etc.) is, for example, a designer (creator) proposing a design of a poster, bookbinding, various layouts and the like, a client placing an order for such a designer (creator) with a design, and the like.

Note that various limitations technically preferable to implement the present invention are imposed on the embodiment described below. However, the scope of the present invention is not limited to the following embodiment and depicted examples.

In the following embodiment, description is made using an example in a case where the impression analysis system is made up of a single information processing apparatus. Alternatively, the impression analysis system may be configured by cooperation of a plurality of information processing apparatuses and the like.

[Entire Configuration]

Figure 1:
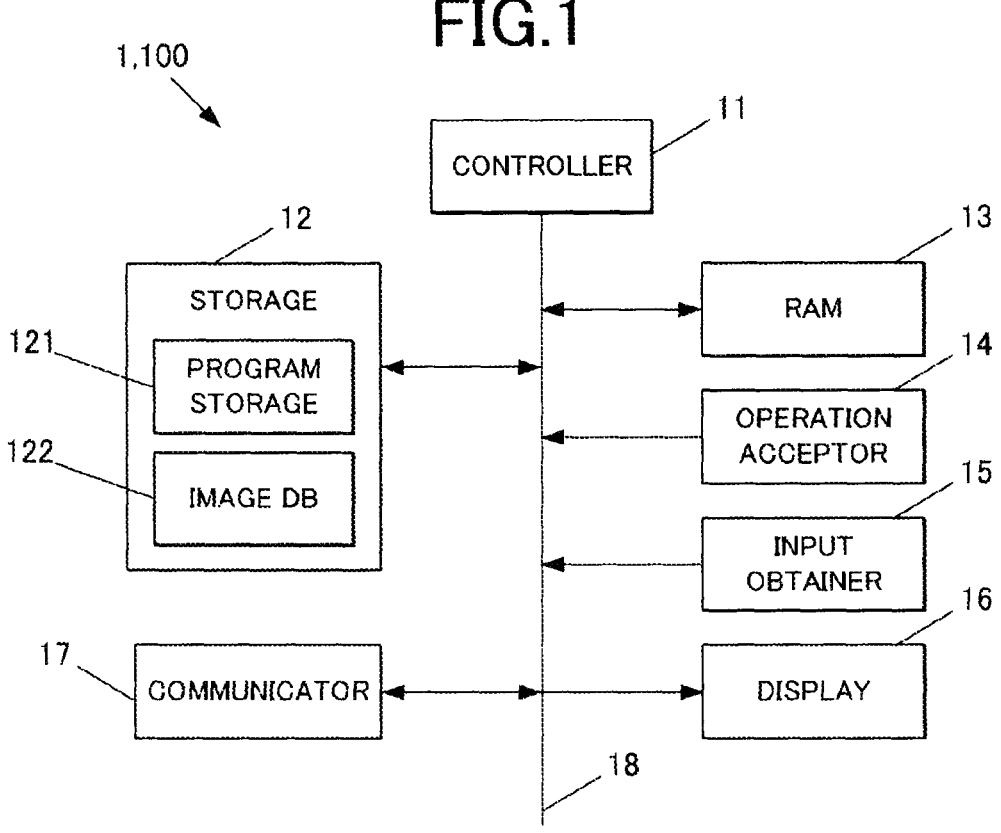
FIG. 1 is a principal block diagram showing a functional configuration of an information processing apparatus that constitutes an impression analysis system according to this embodiment.

FIG. 1 is a principal block diagram showing a functional configuration of the impression analysis system according to this embodiment (an information processing apparatus that constitutes the impression analysis system).

The information processing apparatus 1, which constitutes the impression analysis system 100 according to this embodiment, is a typical computer (PC), for example.

As shown in FIG. 1, the information processing apparatus 1 includes an operation acceptor 14, an input obtainer 15, a display 16, a communicator 17, a controller 11 (hardware processor) made up of, for example, a CPU (Central Processing Unit) or the like, a storage 12, and a RAM (Random Access Memory) 13, which are connected to each other by a bus 18.

The operation acceptor 14 accepts an input operation from the outside, generates an input signal in accordance with the input operation, and outputs the signal to the controller 11. The operation acceptor 14 includes, for example, a keyboard, and any of various pointing devices including a mouse. The operation acceptor 14 may include various switching elements, such as a power supply switch and a reset switch. In addition to or instead of them, the operation acceptor 14 may include a touch panel or the like positioned on the display screen of the display 16 in an overlaid manner.

The input obtainer 15 is an obtainer that obtains image data (hereinafter also called "evaluation target image") serving as an impression analysis target (evaluation target), from an external apparatus or the like (e.g., a dedicated terminal or the like used for creating a design) (inputs the data into the impression analysis system 100).

The input obtainer 15 is made up of, for example, a network interface or the like, and is configured to receive data from external equipment connected in a wired or wireless manner through a communication network. Note that the input obtainer 15 is not limited to what is made up of the network interface or the like, and may be made up of a port and the like into which a USB memory, an SD card or the like are inserted and which can capture the image data.

The display 16 includes a display screen formed by a monitor, such as a liquid crystal display (LCD), for example. Note that a touch panel functioning as the operation acceptor 14 may be integrally formed on the display screen.

The display 16 performs a display operation on the display screen in accordance with control by the controller 11. Specifically, based on a display signal input from the controller 11, various images and the like (e.g., an evaluation target image, a reference image, an impression analysis result, etc.) are displayed on the display screen.

Note that the number of displays 16 provided in the impression analysis system 100 (the information processing apparatus 1 constituting the impression analysis system 100) is not limited to one. For example, a plurality of monitors may be provided.

The communicator 17 controls transmission and reception of data between the information processing apparatus 1 and the outside in conformity with a predetermined communication standard. The communication standard is not specifically limited, and may be, for example, the TCP/IP related to a LAN (Local Area Network). In addition to or instead of this, the communicator 17 may be what can perform communication control pertaining to wireless communication, such as of WiFi. Furthermore, the communicator 17 may include a driver that controls one-to-one communication, such as USB (Universal Serial Bus) or the like.

The controller 11 is a hardware processor that performs various computation processes, and comprehensively controls the operation of the information processing apparatus 1. The controller 11 may be made up of a single CPU, or include a plurality of CPUs that perform computation processes in parallel. Alternatively, a plurality of CPUs may be assigned in accordance with functions, and independently perform computation.

The storage 12 is a non-volatile storage medium, for example, a flash memory, a HDD (Hard Disk Drive) or the like. The storage 12 includes a program storage area 121 that stores programs executed by the controller 11, and an image database ("image DB 122" in FIG. 1).

The image DB 122 stores a reference image Imc associated with impression evaluations. The impression evaluations are, for example, evaluations of a youthful-looking impression, an innocent impression, and a magnificent impression, and are obtained by presenting an image to multiple people, and averaging results of their impression evaluations, for example. The image DB 122 stores multiple pairs of such impression evaluations and various images (reference images Imc) associated with each other.

The number of impression evaluations for a certain image may be one, or for example, a plurality of impression evaluations may be associated with one image. That is, the impression evaluation associated with the reference image Imc may be, for example, only the most frequent impression (e.g., the impression evaluation of an image A: modern, etc.), or a plurality of obtained evaluations represented as points or the like (e.g., impression evaluations of the image A: modern with 4.8 points, natural with 1.2 points, magnificent with 3.4 points, etc.). Note that multiple types of reference images Imc may be prepared for a single image in accordance with the age group, gender and the like of people interviewed for the impression evaluation.

The impression evaluation may be associated with a color (single color), coloration (combination of colors) or the like instead of the image. In this case, the storage 12 may store, for example, an association table or the like that associates a color (single color) or coloration (combination of colors) with its impression evaluation. In a case where a certain impression evaluation is determined as a result of use of a color (single color) or coloration (combination of colors) for a certain image, the analysis result of the use of the color and the coloration for the image, and the impression evaluation are associated with the image, which is registered as the reference image Imc.

The storage 12 stores various setting data items and the like required by the controller 11 to perform various processes.

The storage 12 is not limited to what is internally included in the information processing apparatus 1, and may be an external device. The storage 12 may be positioned on a network, such as a cloud server.

The RAM 13 provides a working memory space for the controller 11, and stores temporary data. The RAM 13 is, for example, a DRAM, from and into which a large amount of data can be read and written at high speed. The stored temporary data may include evaluation target image data (evaluation target image) that is obtained through the input obtainer 15, the communicator 17 and the like.

Note that the information processing apparatus 1 does not include the operation acceptor 14 and/or the display 16, and may accept an input operation (command) and transmit display data by access from the outside via the communicator 17.

Here, description has been made assuming that the single information processing apparatus 1 performs all the processes. Alternatively, an impression analysis system may be adopted in which the controller 11 is arranged in a plurality of computers in a distributed manner and which executes each process while appropriately transmitting and receiving data.

Here, the details of the functions of the controller 11 are described.

The controller 11 reads various processing programs stored in the program storage area 121 of the storage 12, loads the programs into the RAM 13, and executes various processes according to the programs. In this embodiment, the controller 11 achieves various functions as below through cooperation with the programs.

That is, the controller 11 functions as a feature amount extractor, and a similarity determiner. In this embodiment, the controller 11 further functions also as an improvement proposer.

The controller 11, as the feature amount extractor, extracts low-order image feature amounts and high-order image feature amounts from "evaluation target image" input into the impression analysis system 100 (information processing apparatus 1) through the input obtainer 15.

Note that a specific method of the controller 11, as the feature amount extractor, extracting the low-order image feature amounts and the high-order image feature amounts from the "evaluation target image" input through the input obtainer 15 is described later.

Here, "low-order image feature amount" is a physical image feature amount that includes, for example, a color, luminance, and bearing (the direction and shape of an edge), and is a component for guiding the line of sight of a person so as to be concentrated extrinsically and passively. In this embodiment, "low-order image feature amount" is a concept widely encompassing at least any of the color, luminance distribution, bearing, contrast, face, font, and motion.

The impression made on a person viewing the image varies depending on elements, such as colors (e.g., hues, tones, etc.) used for components constituting the image, the brightness (luminance) distribution in each component, the bearing (direction), and contrast.

For example, pale colors tend to make a calm and gentle impression on a viewing person, and deep colors tend to make a strong impression. For example, in a case of arrangement entirely in a fixed direction, a stable impression tends to be made. In a case where only a part is arranged in a different direction (edge direction), an unstable impression tends to be made. Furthermore, the impression varies depending also on whether a portion recognized as a face is in the image or not. In a case where there is a portion recognized as a face, the impression tends to vary depending on whether the portion is the face of a child or the face of a grown man. In a case where the elements constituting the image are characters, the impression made on a viewing person varies depending on the type and size of the font. The fonts involve characters with specific typefaces. There are fonts with various typefaces, such as a print style, a block style, and cursive style. Depending on which font is used for representation, the impression of the entire image may vary, i.e., whether a strict and hard impression or a pop and enjoyable impression is made on a viewing person. Even with the same typeface, the entire impression possibly changes depending on whether the characters are large or small.

Furthermore, "evaluation target image" is not limited to a still image, and may be a moving image. In the case where "evaluation target image" is a moving image, various motions (movements and exercises) in the image also affect the impression of the viewing person. For example, a moving image that is moving slowly makes an easygoing impression. A moving image that is moving at high speed tends to make a busy impression, and an urgent impression.

The "high-order image feature amount" is a physiological and spiritual image feature amount in which memory, experience, knowledge, and the like of a person are reflected and is a component for guiding the line of sight of the person so as to be concentrated intrinsically and actively. More specifically, the "high-order image feature amount" is the component derived from human spiritual and psychological tendencies, the line-of-sight movement tendency, and the like that are regarded to affect the impression made on the person viewing the image. In this embodiment, the high-order image feature amount includes at least any of the degrees of the position bias, and the processing fluency.

For example, the position bias is a concept that accommodates, as line-of-sight movement tendencies: "center bias" where the line of sight tends to be concentrated on an object at the center of an image; a tendency that the line of sight tends to move from the top left to the bottom right of the image, and the line of sight tends to be concentrated on the top left on, for example, a magazine, a webpage, and the like; a tendency where when a vertically written document is viewed, the line of sight tends to move from the top right to the bottom left, and the line of sight tends to be concentrated at the top right; and further, for example, a tendency where the line of sight tends to be concentrated at a portion close to the height of the eye level in a layout in a store, assuming a case in the store, such as a supermarket. Even if the same combination of colors is used, the impression on the person viewing the image and the like sometimes varies depending on the position and the like where each color is arranged.

The processing fluency indicates that in general it is easy for a person to process what is simple and easily recognizable, and is difficult to process what is complicated and is difficult to understand. According to this embodiment, in a certain sense, the processing fluency means that the line of sight tends to be placed and fixed at a portion that is easily recognizable and has a high processing fluency in the image, and the line of sight is less likely to be fixed at a portion that is difficult to be recognized and has a low processing fluency. The processing fluency affects the impression of the person viewing the image depending on which color is arranged at a place of tending to attract the line of sight.

In this embodiment, the degree of the processing fluency includes what is determined by at least any of the degree of complexity, design density, spatial frequency, and saliency.

That is, at a location and the like where the design and the like are randomly congested, an abrupt change, such as an edge, occurs in the image, and the spatial frequency is high at such a location. At a portion having a too high degree of complexity, design density, and spatial frequency, the processing fluency is low.

On the other hand, also at a portion having a too low saliency, degree of complexity, design density and spatial frequency, i.e., an area including no information, it is difficult to read information, and perform processing, and the line of sight does not tend to be fixed.

The controller 11, as the similarity determiner, compares the data obtained by extracting the low-order image feature amount and the high-order image feature amount from the reference image Imc associated with the impression evaluation, with data of the image feature amounts extracted by the controller 11, as the feature amount extractor, from the "evaluation target image" (image Imo), and calculates a similarity between the "evaluation target image" (image Imo) and the reference image Imc. The similarity is calculated with respect to each image feature amount. Note that the similarity may be determined by multiplication of two or more elements (image feature amounts) (for example, a similarity is determined in consideration of two elements that are the color component and the luminance component). Each image feature amount may be assigned a weight in accordance with the degree of affecting the impression. After the similarity is determined for each image feature amount, the determination result may be multiplied by the weight in accordance with the degree of affecting the impression, and a comprehensive impression evaluation of the entire "evaluation target image" (image Imo) may be derived.

A specific method of calculating the similarity by the controller 11, as the similarity determiner, is described later.

The controller 11, as the improvement proposer, proposes an improvement about the impression of "evaluation target image" (image Imo) in accordance with the value of the image feature amount.

For example, when the impression evaluation of "evaluation target image" (image Imo) in the current situation is "modern", an improvement idea for changing "evaluation target image" to an image having a desired impression evaluation, or what measures should be taken to change the image to that having a design with a "magnificent" impression, is proposed for the evaluator (designer etc.). Note that a specific proposal example and the like are described later.

[Impression Analysis Method in this Embodiment]

According to this embodiment, the impression analysis method extracts the low-order image feature amount, and the high-order image feature amount, from "evaluation target image" input through the input obtainer 15 (feature amount extracting), compares data obtained by extracting the low-order image feature amount and the high-order image feature amount from the reference image Imc associated with the impression evaluation, with data of the image feature amount extracted from the "evaluation target image", and calculates a similarity between the "evaluation target image" and the reference image Imc (similarity determining).

Figure 2:
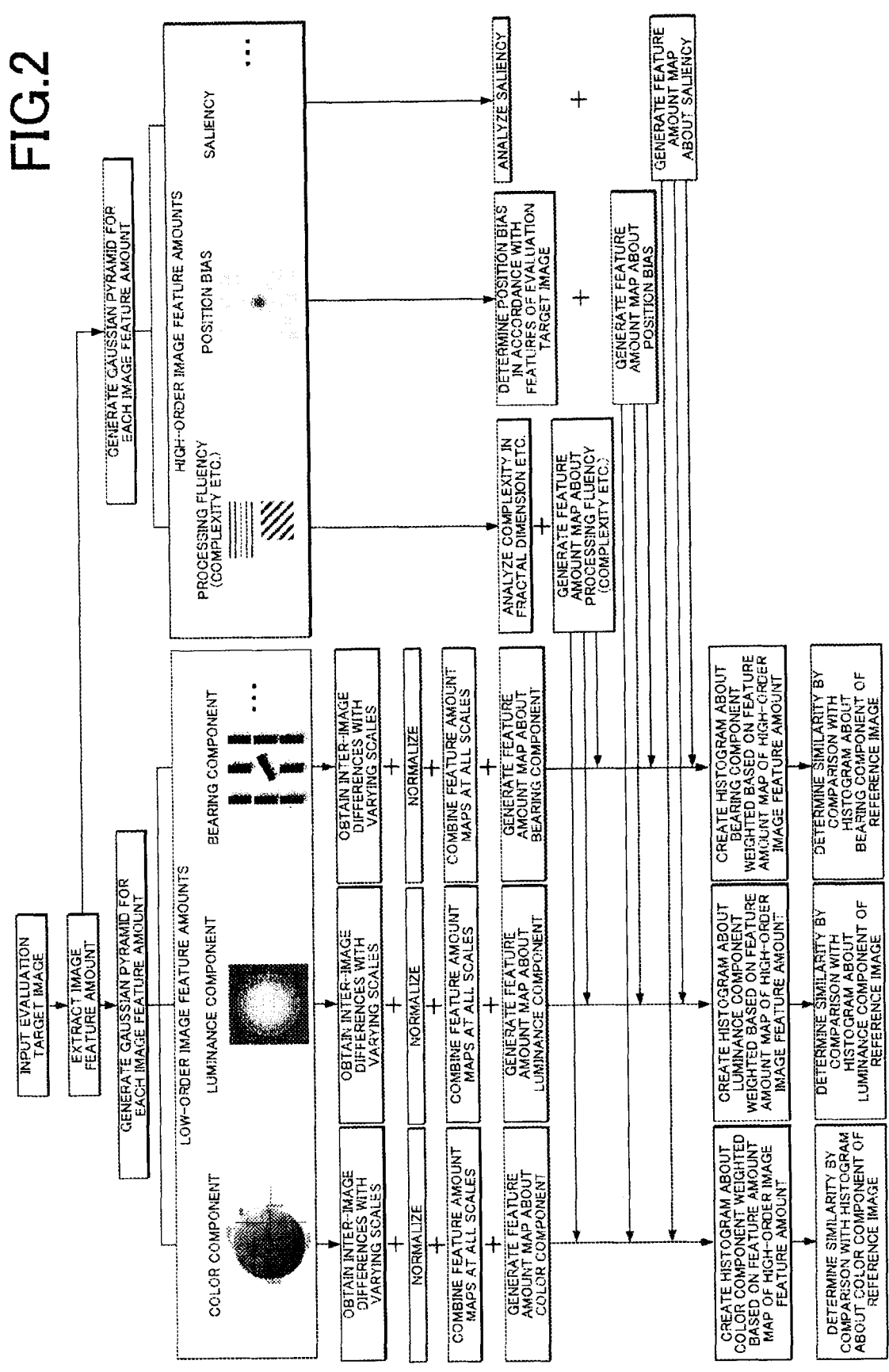
FIG. 2 is an explanatory view schematically illustrating a flow of an impression analysis process for an evaluation target image according to this embodiment.

FIG. 2 is an explanatory view schematically illustrating the flow of an impression analysis process according to this embodiment.

As shown in FIG. 2, according to the impression analysis method in this embodiment, first, the "evaluation target image" is input into the impression analysis system 100 through the input obtainer 15. For example, the designer (creator) inputs an image of a poster or the like created by themself, from a terminal dedicated for design, or the like into the impression analysis system 100 (the information processing apparatus 1 constituting the impression analysis system 100) through the communication network etc. Here, for example, a case where the image Imo shown in FIG. 3A is input as the "evaluation target image" is described as an example.

Figure 3A:
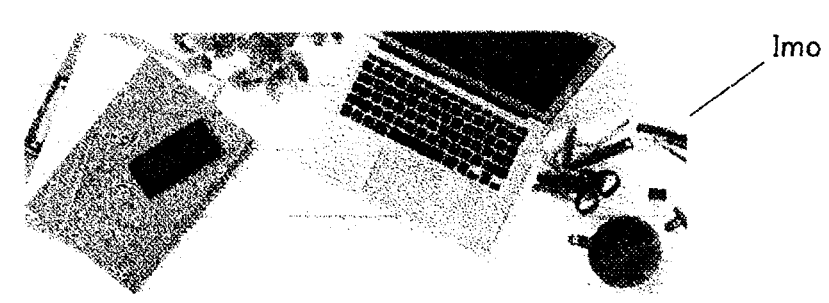
FIG. 3A shows an example of an evaluation target image.

After the "evaluation target image" is input, the controller 11 serves as the feature amount extractor, and extracts the low and high-order image feature amounts from the "evaluation target image" (the image Imo in FIG. 3A).

In the extraction of the low-order image feature amount, the controller 11 then applies a blurring process (a process of reducing the resolution of an image) by Gaussian filters to the "evaluation target image" (the image Imo in FIG. 3A). Specifically, a group of images (multiresolution representation of the image; a Gaussian pyramid) are generated, for each low-order image feature amount, by gradually applying the plurality of Gaussian filters with varying blurring degrees to the "evaluation target image" (image Imo).

Note that in FIG. 2, the color component, luminance component, and bearing component are exemplified as the low-order image feature amounts. However, as described above, the elements of the low-order image feature amounts are not limited to them. For example, in a case where the image Imo input as the "evaluation target image" is a moving image, an element of a motion (movement) and the like are also included.

After the groups of images (Gaussian pyramid) for the respective components of image feature amounts are generated, inter-image differences with varying scales are obtained (calculated) for the respective elements of the image feature amounts, using the multiresolution representation. After the difference image is obtained, the controller 11 normalizes the image, combines the feature amount maps at all the scales with respect to each component of the image feature amount, and generates the feature amount map for each of the low-order image feature amounts.

In this embodiment, the processing fluency (complexity etc.), the position bias, and the saliency are extracted as high-order image feature amounts by the controller 11 serving as the feature amount extractor (see FIG. 2).

Here, the processing fluency (complexity etc.), the position bias, and the saliency are exemplified as high-order image feature amounts. However, as described above, the high-order image feature amounts are not limited to them. Various elements (components) other than them can be included.

As described above, the processing fluency can be measured by the degree of complexity, and can be analyzed and quantified by a method of obtaining the fractal dimension, for example. That is, the "evaluation target image" (image Imo) is divided into multiple meshes, and analysis is performed to find portions with a dense dot-represented configuration, and portions with a sparse configuration. As a result, a portion in a high fractal dimension (e.g., 1.8) is evaluated as a complex and random portion, and a portion in a low fractal dimension (e.g., 1.2) is evaluated as a simple portion having a small amount of information.

For example, in a case of an image shown in FIG. 3A, a background portion on which nothing is placed is evaluated to have a low fractal dimension, and a portion on the right side of the notebook personal computer with stationary being randomly placed is evaluated to have a high fractal dimension. The controller 11 generates the feature amount map, based on the degree of complexity (processing fluency) quantified as described above.

As described above, the background portion with little information has a low fractal dimension, is a portion less likely to attract attention, and has a low processing fluency. Consequently, the feature amount map about the processing fluency (complexity) is a map where the background portion with little information, and very complex portions are evaluated to have low processing fluencies, and portions having an appropriate complexity are evaluated to have the highest processing fluency.

The degree of complexity that is a degree of complex nature may be what is analyzed and quantified using a method of obtaining a local fractal dimension. Specifically, the controller 11 calculates the degree of complexity by a region growing method (S. Novianto, Y. Suzuki, and J. Maeda, "Near optimum estimation of local fractal dimension for image segmentation." Pattern Recognition Letters 24.1-3: 365-374 (2003)).

The degree of complexity can thus be a value in more conformity with feeling of a person.

Furthermore, in accordance with the characteristics and type of the image Imo input as the "evaluation target image" (for example, whether the image is an image having a purpose of being published in a book or posted on a webpage, or an image to be inserted into a vertically written document), the controller 11 generates the feature amount map of the position bias depending on the place and the direction where the line of sight tends to be guided in consideration of human psychological characteristics.

For example, in a case where the image Imo input as the "evaluation target image" is posted on a webpage, the map indicates that the image feature amount at the top left of the image is high, and the image feature amount at the bottom right is low.

According to this embodiment, the controller 11 as the feature amount extractor extracts the saliency as a high-order image feature amount (see FIG. 2). The saliency is an impact on a person viewing a design (image etc.), and the degree of visual fixation (conspicuity), and is extracted by generating the feature amount map about the image feature amounts, based on the low-order image feature amount and the high-order image feature amount about the image Imo input as "evaluation target image".

Note that, as for the saliency, analysis is performed by any of various publicly known saliency evaluation methods, and the feature amount map can be obtained (generated).

After the high-order feature amount map is generated, the controller 11 as the similarity determiner compares data of each image feature amount obtained by multiplying each pixel by the corresponding value of the high-order feature amount map, with the data of each image feature amount extracted from the reference image Imc, and calculates the similarity of the low-order image feature amount.

Note that the method of extracting each image feature amount from the reference image Imc is similar to that in the case of the "evaluation target image" (image Imo). Accordingly, the description is omitted. The feature amount map of each image feature amount about the reference image Imc may be preliminarily created, and stored in the storage 12 or the like in a state associated with the reference image Imc.

The method of comparing the "evaluation target image" (image Imo) with the reference image Imc, and the method of determining the similarity are not specifically limited. Any of various methods can be used. For example, FIG. 2 exemplifies a case of creating histograms of both the images, and determining the similarity. In this case, the similarity of histograms of both the images can be determined using the EMD (Earth Mover's Distance) algorithm, for example. The EMD method compares a histogram of the image feature amounts of "evaluation target image" (image Imo) with a histogram of the image feature amounts of the reference image Imc, and determines that as the histograms (shapes of histograms) are closer to each other, the value of EMD is closer to "0", and both are similar to each other.

Specifically, according to the EMD method, in consideration of the minimum cost (effort) for converting one distribution to the other distribution, as the cost is lower, the EMD has a smaller value, and the similarity is determined to be high, and as the cost is higher, the EMD has a larger value, and the similarity is determined to be low. For example, in a case of a color distribution, the similarity is determined based on the magnitude of the product of the distance of color to be moved to make the color distribution closer and the amount of movement.

Here, a case of calculating the similarity about the color component between the "evaluation target image" (image Imo) and the reference image Imc is described.

In this case, for each of the "evaluation target image" (image Imo), and the reference image Imc, the color components are clustered, and a histogram of color pixels is generated. For example, the histogram is created so that the "evaluation target image" includes a certain number of black dots, a certain number of red dots, a certain number of white dots, a certain number of blue dots, a certain number of brown dots, and so on. Likewise, a histogram is also created so that the reference image Imc includes a certain number of black dots, a certain number of red dots, a certain number of white dots, a certain number of blue dots, a certain number of brown dots, and so on.

For example, when the similarity between the "evaluation target image" (image Imo) shown in FIG. 3A, and the reference image Imc shown in FIG. 4A is intended to be identified, the reference image Imc is selected from the image DB 122, and is set as the reference image Imc with which the "evaluation target image" is compared.

Note that the method of setting the reference image Imc is not specifically limited. For example, all the images stored in the image DB 122 may be set as reference images Imc, and each of the similarities indicating which image makes an impression closest to that of the "evaluation target image" (image Imo) may be evaluated.

In a case where the impression that the evaluator (designer etc.) intends to obtain about the "evaluation target image" (image Imo) is "natural", and an intention to determine how "natural" the "evaluation target image" (image Imo) is, is input through the operation acceptor 14 or the like, an image associated with "natural" impression evaluation may be set as the reference image Imc among the images stored in the image DB 122.

Note that the reference image Imc may be automatically selected and set. The evaluator (designer etc.) may freely select and set an image whose impression is intended to be compared with the impression of the "evaluation target image" (image Imo) (for example, an image associated with the "natural" impression evaluation is retrieved from the image DB 122 and is selected).

Figure 3B:
FIG. 3B shows color components constituting the evaluation target image, in a clustered manner.
Figure 3C:
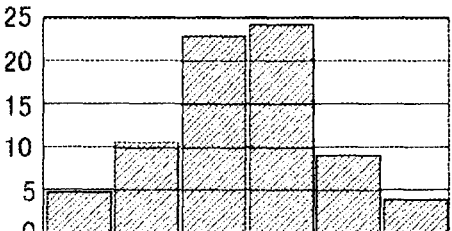
FIG. 3C shows the color components shown in FIG. 3B in a histogram.

FIG. 3B shows the color components constituting the "evaluation target image" (image Imo) in a clustered manner. FIG. 3C shows an example of a histogram of the color components shown in FIG. 3B. FIG. 4A shows an example of the reference image Imc associated with the "natural" impression evaluation. FIG. 4B shows the color components constituting the reference image Imc in a clustered manner. FIG. 4C shows an example of a histogram of the color components shown in FIG. 4B.

Figure 5:
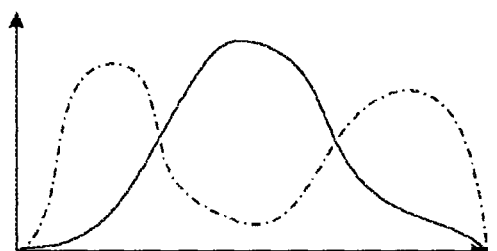
FIG. 5 shows an example of a histogram in a case where the evaluation target image is not similar to the reference image.

For example, in a case where the histogram of the "evaluation target image" (image Imo) has a shape as indicated by a solid line in FIG. 5, and the histogram of the reference image Imc has a shape as indicated by a chain line in FIG. 5, making the histogram indicated by the solid line have a shape close to that of the histogram indicated by the chain line requires that a convex is once largely removed, and most of it is moved, which requires high cost (effort). Accordingly, the similarity between both is determined to be low.

Figure 6:
FIG. 6 shows an example of a histogram in a case where the evaluation target image is similar to the reference image.

On the other hand, in a case where the histogram of the "evaluation target image" (image Imo) has a shape as indicated by a solid line in FIG. 6, and the histogram of the reference image Imc has a shape as indicated by a chain line in FIG. 6, both the shapes do not have a large difference, and the cost (effort) required to make the histogram indicated by the solid line close to the shape of the histogram indicated by the chain line is allowed to be low. Accordingly, the similarity between both is determined to be high.

Note that the similarity between the "evaluation target image" (image Imo) and the reference image Imc may be determined by any method.

In the case where the determination of the similarity is related to the multiple image feature amounts, the similarities may be evaluated for the respective feature amounts, or be evaluated in a comprehensively combined manner. The method to be used is appropriately selected in accordance with the purpose and the like of evaluating the similarity. In the case where multiple image feature amounts are combined and the similarity is evaluated, any of various methods can be used: for example, multiple feature amounts are mapped by a dimension reduction method, such as principle component analysis, and the similarity is determined by the distance of the map of the principle component analysis. Note that the similarity evaluation in this case is not limited to the method of the principle component analysis.

In this embodiment, the high-order image feature amounts, such as the processing fluency, the position bias, and the saliency, are also considered to calculate the similarity between the "evaluation target image" (image Imo) and the reference image Imc. Specifically, for example, in a case of determining the similarity about the color components, the entire coloration is not evaluated with the same weight, but the weight based on the high-order image feature amounts, such as the processing fluency, the position bias, and the saliency, is assigned, and a portion where the high-order image feature amounts, such as the processing fluency, the position bias, and the saliency, are large in the entire image is assigned more weight in the evaluation than other portions when comparison using the histogram is made.

That is, as shown in FIG. 2, according to this embodiment, the feature amount map is generated for the high-order image feature amounts, such as the processing fluency, the position bias, and the saliency. In similarity determination, the feature amount map of the low-order image feature amounts is weighted based on the feature amount map about the high-order image feature amounts. For example, even if the same color is used, the weighting varies depending on whether the color is used at a portion of attracting the line of sight in view of the position bias or used for a portion attracting no attention. In the former case of using the color, it largely affects similarity determination. In the latter case, it less affects similarity determination.

For example, in the "evaluation target image" (image Imo), the background portion on the lower side includes little information, and is not important in view of the processing fluency. At a portion that is too random and complex and is difficult to attract the line of sight (for example, in the "evaluation target image" (image Imo), a portion and the like where pieces of stationary are placed to the right of a notebook personal computer), the image feature amount is small in view of the processing fluency. The histogram is compared so that such a portion having a small high-order image feature amount (processing fluency) can be assigned a small weight.

In a case where the "evaluation target image" (image Imo) in this embodiment is an image posted on a webpage, the line of sight tends to be concentrated at the top left. Consequently, the impression of the color and the like used at the top left in the image is higher than the impressions of colors at the other portions. Accordingly, the colors (single color and coloration) at the top left are more highly weighted than the other portions, and the histograms are compared.

If the histograms are compared only about the low-order image feature amounts, such as information on the color component and the luminance component, for example, determination is performed mainly about the background color occupying many portions in the image. There is a possibility that colors used in small area ranges are hardly considered. On the other hand, the color and the like at a portion less attracting the human visual attention in actuality are sometimes largely evaluated if the color is used at a portion with a random and complex design even in a case of use over a wide region in terms of area. Unlike these, by considering the high-order image feature amounts as in this embodiment, the similarity between the "evaluation target image" (image Imo) and the reference image Imc is high, and it is determined that a similar impression evaluation is made for a viewing person, in a case where a similar color is used, even partially, in a similar region (e.g., the top left). Accordingly, an analysis result closer to the impression evaluation in a case where a person actually views it can be obtained.

Similarly complex and random images sometimes make similar impressions for the viewing person. Accordingly, by considering the high-order image feature amounts, such impression similarity (similarity nature) can also be reflected in the evaluation result appropriately.

The way of presenting the impression evaluation is not specifically limited. For example, the histogram itself as shown in FIGS. 5 and 6 may be displayed on the display 16 or the like, and the impression evaluation may be represented as a numeric character or the like: the freshness impression of the entire image is 3.5.

The degree of influence of each image feature amount may also be displayed in a numerical value or the like, for example, how and what image feature amount affects the impression evaluation: an "adorableness" impression based on the coloration is 3.5, and an "activeness" impression based on the bearing (the direction of an edge etc.) is 5.6.

The ways of presenting and outputting the impression evaluation are not limited to those for displaying on the display 16 or the like. For example, audio output and the like may be performed, and output may be performed through printing and the like. The analysis result may be transmitted from the information processing apparatus 1 to the external apparatus.

The controller 11, as the improvement proposer, proposes an improvement about the impression of "evaluation target image" (image Imo) in accordance with the value of the image feature amount.

For example, in a case where the image shown in FIG. 3A is the "evaluation target image" (image Imo), a coloration changing example for changing the impression evaluation is shown in FIG. 7.

In the example shown in FIG. 7, according to the current coloration (coloration ratio) as indicated at the left end in FIG. 7, in a case where the similarity with the reference image Imc having the "magnificent" impression evaluation is 0.008 (for example, the impression evaluation in the current situation is "modern"), it is shown, together with variation in similarity, how to change the coloration in order to achieve an image having "magnificent" impression that is a desired impression.

In the example in FIG. 7, as the coloration is changed to that having darker impression as a whole, the similarity with the reference image Imc having the "magnificent" impression increases. It is shown that at the similarity of 1.000, the impression that is dark and heavy as a whole is achieved.

Note that the case of changing the coloration is herein exemplified. Likewise, an improvement can be proposed also about another image feature amount (e.g., the luminance component etc.).

The improvement may be proposed with respect to each image feature amount, or with respect to a combination of two or more elements (items). Multiple patterns of simulation results and the like indicating which element (component) is changed, how the change is made, and how the impression evaluation is changed (improved) accordingly may be obtained and arranged on the display 16 or the like, thus proposing how much degree the change is made and what impression is made accordingly, to the evaluator (designer etc.). In this case, it is preferable to indicate which element in the original image Imo is changed, how change is made, and the similarity and the like with the desired impression image (reference image Imc), in numerical values.

Note that the way of proposing an improvement idea to the evaluator (designer etc.) is not limited to the depicted examples.

For example, an image in a case where the similarity of the "evaluation target image" (image Imo) is changed to that with coloration having a similarity of 10000 with the reference image Imc having "magnificent" impression, may be displayed together. Images and the like having a similarity of 0.027 and a similarity of 0.124 in a process of change to an image having the "magnificent" impression may be allowed to be appropriately displayed.

For example, a slide bar or the like may be displayed on a screen, and situations where the "evaluation target image" (image Imo) is changed when the evaluator (designer etc.) slides an element intended to be changed may be allowed to be gradually viewed. In this case, a configuration may be adopted where when an image having a desired impression is achieved, the image can be fixedly determined, and stored.

Results obtained by changing various image feature amounts may be presented in multiple grades to the evaluator, or they may be stored as an improvement idea 1, an improvement idea 2, and so on. Preferably, each improvement idea is presented together with a numerical value so as to show which element (image feature amount) is changed and how the change is made.

Accordingly, the evaluator can specifically know which image feature amount is changed, how the change is made, and how much degree the impression evaluation of the "evaluation target image" can be brought closer to the image (reference image Imc), and what impression the image has. Accordingly, it can be easily understood what measures are taken to achieve a desired impression in the case where the evaluator is a designer, and an improved design can be easily created.

Even in a case where a client placing an order of creating a design is the evaluator, it can be specifically pointed out what is changed and how the change is made in order to achieve a design having a desired impression when a design idea is proposed by the designer or the like.

For example, in a case where the impression is evaluated based only on the low-order image feature amounts as with the conventional example shown in FIG. 8, the human psychological way of placing the line-of-sight, and the way of moving the line of sight are not reflected in the impression evaluation, and the impression of the image Imo cannot correctly be determined.

In a case where impression evaluations of multiple (n) test subjects viewing various images are preliminarily obtained and collected, the impression evaluations of images are assigned tags and collected in a database, and impression analysis is performed by deep learning, input of new images allows an impression evaluation to be obtained where for example, as shown in FIG. 9, actual human ways of feeling about the input images ("input images" of images 1 to 3 . . . in FIG. 9) are reflected. As for the impression evaluation, as shown as a tagged example 1 in FIG. 9, for example, only the most frequent impressions may be associated with the input image and stored (i.e., tagged with "cool" in the case of the image 1). As shown as a tagged example 2, for example, multiple impression evaluations accompanied by the respective points may be associated with the input image and stored (i.e., in the case of image 1, tagged with "cool: 4.8, natural: 1.2, and heavy: 3.4").

Although in the case of impression evaluation by deep learning, the evaluation result can be shown, it cannot be indicated why the "evaluation target image" is evaluated as such an impression. Accordingly, the evaluator (designer etc.) to which the result is presented cannot find the way of improvement about how the design is changed to achieve an image having a desired impression with reference to the current situation.

In such a situation, according to this embodiment, by combining the low-order image feature amounts and the high-order image feature amounts with each other, the accuracy of the impression analysis and the impression determination can be improved. The directionality of improvement about how the evaluator (designer etc.) improves the "evaluation target image" to an image having a desired impression evaluation can be indicated. Sufficient information can be provided for support for the designer, etc.

[Method of Calculating Dominant Color Coloration Ratio]

Next, a method of calculating the dominant color coloration ratio is described.

To analyze the design impression, colors of the "evaluation target image" are sometimes analyzed.

In this case, according to the conventional art, a color subtraction process is applied to "evaluation target image", the coloration pattern (dominant color) is extracted, and the area ratio of each extracted color occupying the "evaluation target image" is calculated. The calculated area ratio is adopted as the dominant color coloration ratio for the "evaluation target image".

However, the dominant color coloration ratio calculated by the conventional art described above does not match the impression felt when a person actually views the "evaluation target image" in some cases.

For example, for an image where the base color is white, and a chromatic color is present as an accent color, the tendency is significantly represented. The image is, for example, a slide image of PowerPoint (R).

In the slide image, the area occupied with white is far larger than that occupied with every other chromatic color. However, when a person views the slide image, they feel that a chromatic color as an accent color occupies an area equal to or larger than a predetermined amount irrespective of the area ratio of white serving as the base color.

Figure 10:
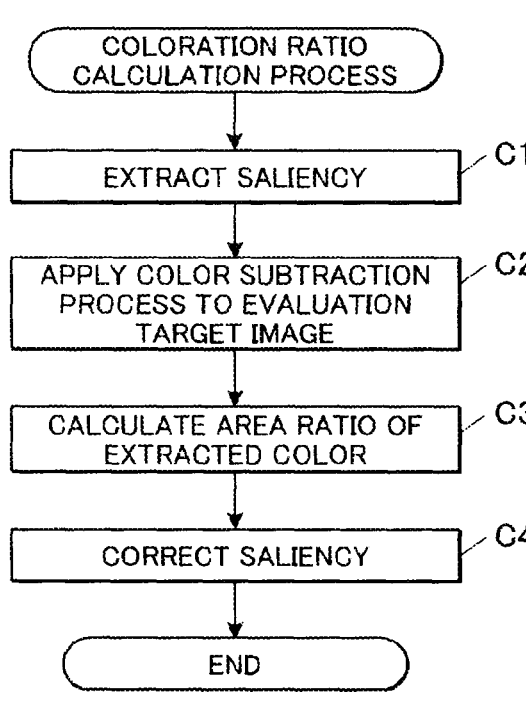
FIG. 10 is a flowchart showing a flow of a coloration ratio calculation process.

In such a situation, according to this embodiment, the controller 11 executes the coloration ratio calculation process shown in FIG. 10, and calculates the dominant color coloration ratio in the "evaluation target image". Here, the controller 11 functions as a ratio calculator.

If the "evaluation target image" is not an image indicating the dominant color, the controller 11 executes the coloration ratio calculation process. The image indicating the dominant color is an image of the dominant color itself.

(Coloration Ratio Calculation Process)

The controller 11 extracts the saliency as a high-order image feature amount from the "evaluation target image" (Step C1).

If a transparent area resides in the "evaluation target image", the controller 11 sets a predetermined gradation in the transparent area, and extracts the saliency in Step C1.

Next, the controller 11 applies the color subtraction process to the "evaluation target image", and extracts the dominant color (Step C2).

If the transparent area resides in the "evaluation target image", the controller 11 excludes the transparent area, and executes the color subtraction process in Step C2.

Next, the controller 11 calculates the area ratio of each color extracted in Step C2 occupying the "evaluation target image" (Step C3).

Next, the controller 11 weights the area ratio calculated in Step C3 with a numerical value representing the degree of saliency extracted in Step C1, thus achieving correction. The controller 11 adopts the corrected value as the dominant color coloration ratio (Step C4), and finishes the processing. Accordingly, for example, the area ratio of the dominant color corresponding to the area with a large saliency is corrected to a larger value.

Note that the order of Steps C2 to C4 in the coloration ratio calculation process is not limited to that in the example shown in FIG. 10.

Specifically, after Step C1, the controller 11 weights the area ratio of each color included in the "evaluation target image" with a numerical value representing the degree of saliency extracted in Step C1, thus achieving correction. Next, the controller 11 applies a color subtraction process to the "evaluation target image" whose area ratio has been corrected, and extracts the dominant color. Next, the controller 11 may adopt the area ratio at which each extracted color occupies the "evaluation target image", as the dominant color coloration ratio to the "evaluation target image".

Accordingly, the dominant color coloration ratio to the "evaluation target image" calculated by the coloration ratio calculation process can be matched with the impression when a person actually views the evaluation target image.

Advantageous Effects

As described above, the impression analysis system 100 (information processing apparatus 1) according to this embodiment includes the controller 11 that functions as the input obtainer 15 that receives the "evaluation target image", and the feature amount extractor that extracts the low-order image feature amount and the high-order image feature amount from the "evaluation target image", and further functions as the similarity determiner that compares data obtained by extracting the low-order image feature amount and the high-order image feature amount from the reference image Imc associated with the impression evaluation, with data of the image feature amount of the "evaluation target image", and calculates the similarity between the "evaluation target image" and the reference image Imc.

Accordingly, with respect to the image (evaluation target image) about which the impression made when being viewed by a person is intended to be evaluated, the impression of the image in consideration not only of the low-order image feature amounts, such as the color, luminance, and bearing, but also of the high-order image feature amounts, such as the processing fluency, and the position bias can be evaluated and analyzed.

Consequently, the line-of-sight predictability (line-of-sight guidance) having conventionally been achieved using deep learning can also be analyzed. By reflecting the result, the impression can be evaluated with high accuracy. The impression including the line-of-sight predictability is then evaluated without using deep learning. Accordingly, it can be identified not only the evaluation result of the impression but also which element and factor (image feature amount) affect derivation of the result. Accordingly, the process of evaluation does not become a black box.

Such achievement of the system capable of indicating the process of evaluation can obtain the evaluation result easily understandable for the evaluator, such as a designer. That is, the evaluator can know not only the impression simply made by the image (evaluation target image) but also which element and component (image feature amount) contribute to derivation of such an impression about the image.

In this embodiment, the controller 11 also functions as the improvement proposer that proposes an improvement about the impression of "evaluation target image" in accordance with the value of the image feature amount.

This can show whether the "evaluation target image" makes an impression desired by the evaluator, such as the designer, or not. If the desired impression is not achieved, this can show which image feature amount achieves evaluation of making the current impression.

What is changed and how it is changed for improving the impression of the image so as to approach the desired impression, can be presented to the evaluator. Accordingly, the evaluator (designer etc.) can specifically grasp the directionality of design improvement, and appropriately correct the design to achieve the desired impression. Thus, design creation and the like by the designer can be supported.

In this embodiment, the reference image Imc for determination of the similarity with the "evaluation target image" may be freely selected by the evaluator (designer etc.).

Accordingly, an analysis result can be obtained about whether the "evaluation target image" makes a desired impression intended by the evaluator or not, and what measures are taken to cause the impression to approach the desired impression.

In this embodiment, the high-order image feature amount includes at least any of the degrees of the position bias, and the processing fluency.

Accordingly, the human spiritual and psychological tendencies, the line-of-sight movement tendency and the like, which are regarded to affect the impression made on the person viewing the image, can be reflected in impression analysis. Consequently, without use of the conventional deep learning, the impression evaluation including the line-of-sight predictability (line-of-sight guidance) can be exhibited.

In this embodiment, the degree of the processing fluency includes what is determined by at least one of the degree of complexity, design density, and spatial frequency.

Accordingly, the human spiritual tendency that a random and complex location in the "evaluation target image" is less likely to attract visual attention and to achieve line-of-sight concentration, can be reflected in impression analysis.

The degree of complexity in this embodiment is a local fractal dimension.

The degree of complexity can thus be a value in more conformity with feeling of a person.

In this embodiment, the low-order image feature amount encompasses at least any of the color, luminance distribution, bearing, contrast, face, font, and motion.

Accordingly, basic image feature amounts, such as the color and the luminance distribution, can be reflected in impression analysis.

The impression analysis system 100 according to this embodiment includes the ratio calculator (controller 11) that calculates the coloration pattern ratio in the evaluation target image. The feature amount extractor (controller 11) extracts the saliency as the high-order image feature amount. The ratio calculator assigns a weight based on the saliency extracted by the feature amount extractor in calculating the coloration pattern ratio.

Accordingly, the dominant color coloration ratio to the "evaluation target image" calculated in this embodiment can be matched with the impression when a person actually views the "evaluation target image".

In the impression analysis system 100 according to this embodiment, the ratio calculator (controller 11) excludes the transparent area residing in the evaluation target image in calculating the coloration pattern ratio.

Thus, even in the case where the "evaluation target image" includes the transparent area, the dominant color coloration ratio matching the impression felt when a person actually views the "evaluation target image" can be calculated.

In the impression analysis system 100 according to this embodiment, the feature amount extractor (controller 11) sets a predetermined gradation in the transparent area residing in the evaluation target image, and extracts the saliency.

Thus, even when the transparent area is included in the "evaluation target image", the saliency can be appropriately extracted.

[Modifications]

Note that although the embodiment of the present invention has been described above, the present invention is not limited to such an embodiment, and obviously various modifications are possible within a scope that does not depart from the gist of the present invention.

For example, in the embodiment described above, the example is described where the controller 11 of the single information processing apparatus 1 functions as the feature amount extractor, the similarity determiner, and the improvement proposer. However, what functions as the feature amount extractor, the similarity determiner, and the improvement proposer is not limited to the controller 11 of the information processing apparatus 1. A controller of another computer may be responsible for all or some of these functions.

Furthermore, according to the embodiment described above, the example is described where the controller 11 of the single information processing apparatus 1 functions as the ratio calculator. However, what functions as the ratio calculator is not limited to the controller 11 of the information processing apparatus 1. A controller of another computer may be responsible for the entirety or part of the function.

In this case, the impression analysis system is configured including the computer responsible for these functions.

According to this embodiment, the example is described where the processing fluency (complexity) is quantified in the fractal dimension. However, the method of quantifying and evaluating the processing fluency (complexity) is not limited to this. Various methods may be used.

According to this embodiment, the color, luminance distribution, bearing (the direction and shape of the edge), contrast, face, font, and motion are described as examples of the low-order image feature amounts, and the processing fluency, and the position bias are described as the examples of the high-order image feature amounts. However, the image feature amounts affecting analysis and determination in the impression analysis system are not limited to them. Various other elements may be included.

By determining the impression in broad consideration of elements affecting the line-of-sight concentration, movement and the like, a further accurate analysis result can be obtained.

Note that the present invention obviously is not limited to the above embodiment, modifications, and the like, and alterations can be made, as appropriate, without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An impression analysis system, comprising:
an input obtainer that receives an evaluation target image; and
a hardware processor,
wherein
the hardware processor:
extracts a low-order image feature amount, and a high-order image feature amount, from the evaluation target image, and
compares data obtained by extracting a low-order image feature amount and a high-order image feature amount from a reference image associated with an impression evaluation, with data of the image feature amounts extracted by the hardware processor, and calculates a similarity between the evaluation target image and the reference image,
wherein the low-order image feature amount includes at least any of a color, a luminance distribution, a bearing, contrast, a face, a font, and a motion, and
wherein the high-order image feature includes at least any of a degree of position bias and a processing fluency feature, wherein the processing fluency feature includes a degree of complexity, a design density, and aspatial frequency.

2. The impression analysis system according to claim 1, wherein the hardware processor proposes an improvement about an impression of the evaluation target image, in accordance with a value of the extracted image feature amount.

3. The impression analysis system according to claim 1, wherein the degree of complexity is a local fractal dimension.

4. The impression analysis system according to claim 1, wherein the reference image is freely selected by an evaluator.

5. The impression analysis system according to claim 1, wherein the hardware processor:
calculates a coloration pattern ratio in the evaluation target image;
extracts a saliency as the high-order image feature amount; and
assigns a weight based on the extracted saliency in calculating the coloration pattern ratio.

6. The impression analysis system according to claim 5, wherein the hardware processor excludes a transparent area residing in the evaluation target image in calculating the coloration pattern ratio.

7. The impression analysis system according to claim 5, wherein the hardware processor assigns a predetermined gradation to a transparent area residing in the evaluation target image, and extracts the saliency.

8. An impression analysis method, comprising:
extracting a low-order image feature amount, and a high-order image feature amount, from an input evaluation target image; and
similarity determining that compares data obtained by extracting a low-order image feature amount and a high-order image feature amount from reference image associated with an impression evaluation, with data of the image feature amounts extracted by the feature amount extracting, and calculates a similarity between the evaluation target image and the reference image,
wherein the low-order image feature amount includes at least any of a color, a luminance distribution, a bearing, contrast, a face, a font, and a motion, and
wherein the high-order image feature includes at least any of a degree of position bias and a processing fluency feature, wherein the processing fluency feature includes a degree of complexity, a design density, and aspatial frequency.

9. A non-transitory computer readable recording medium storing a program causing a computer to perform:
extracting a low-order image feature amount, and a high-order image feature amount, from an input evaluation target image; and
similarity determining that compares data obtained by extracting a low-order image feature amount and a high-order image feature amount from reference image associated with an impression evaluation, with data of the image feature amounts extracted by the feature amount extracting, and calculates a similarity between the evaluation target image and the reference image,
wherein the low-order image feature amount includes at least any of a color, a luminance distribution, a bearing, contrast, a face, a font, and a motion, and
wherein the high-order image feature includes at least any of a degree of position bias and a processing fluency feature, wherein the processing fluency feature includes a degree of complexity, a design density, and aspatial frequency.

10. The impression analysis system according to claim 1, wherein the high-order image feature includes a degree of position bias of where the line of sight tends to be concentrated.

* * * * *